(12) United States Patent
Nakatsuchi et al.

(10) Patent No.: US 11,175,166 B2
(45) Date of Patent: Nov. 16, 2021

(54) FLOW METER

(71) Applicant: HITACHI AUTOMOTIVE SYSTEMS, LTD., Hitachinaka (JP)

(72) Inventors: Hiroki Nakatsuchi, Tokyo (JP);
Tsutomu Kono, Hitachinaka (JP);
Shinobu Tashiro, Hitachinaka (JP);
Ryotaro Shimada, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/766,771

(22) PCT Filed: Oct. 11, 2018

(86) PCT No.: PCT/JP2018/037991
§ 371 (c)(1),
(2) Date: May 26, 2020

(87) PCT Pub. No.: WO2019/102737
PCT Pub. Date: May 31, 2019

(65) Prior Publication Data
US 2021/0003437 A1    Jan. 7, 2021

Related U.S. Application Data

(63) Continuation of application No. PCT/JP2018/037991, filed on Oct. 11, 2018.

(30) Foreign Application Priority Data

Nov. 27, 2017  (JP) .............................. JP2017-227155

(51) Int. Cl.
*G01F 1/684* (2006.01)
*G01F 15/18* (2006.01)
*G01F 15/14* (2006.01)

(52) U.S. Cl.
CPC ............ *G01F 1/684* (2013.01); *G01F 1/6842* (2013.01); *G01F 15/14* (2013.01); *G01F 15/18* (2013.01)

(58) Field of Classification Search
CPC ........ G01F 1/684; G01F 1/6842; G01F 15/14; G01F 15/18
See application file for complete search history.

(56) References Cited

U.S. PATENT DOCUMENTS

| 2012/0000280 | A1* | 1/2012 | Kishikawa | ............ G01F 15/185 73/204.22 |
| 2012/0103107 | A1 | 5/2012 | Uramachi et al. | |
| 2020/0200613 | A1* | 6/2020 | Yogo | ..................... G01F 1/6842 |

FOREIGN PATENT DOCUMENTS

| JP | 2012-052974 A | 3/2012 |
| JP | 2012-098101 A | 5/2012 |

(Continued)

OTHER PUBLICATIONS

International Search Report, PCT/JP2018/037991, dated Nov. 20, 2018, 2 pgs.

(Continued)

*Primary Examiner* — Ryan D Walsh
(74) *Attorney, Agent, or Firm* — Volpe Koenig

(57) ABSTRACT

A flow meter includes: a flat substrate; a housing that houses the substrate and has an open in at least one surface; a cover that covers the substrate and covers an open surface of the housing; a support that supports the substrate and is in contact with the cover and the substrate; and a fixing unit that connects the substrate and the housing, in which, in a first region and a second region formed by dividing the substrate into two parts at a center in a longitudinal direction, the support is disposed in the first region, and the fixing unit is disposed in the second region.

20 Claims, 21 Drawing Sheets

(56) References Cited

FOREIGN PATENT DOCUMENTS

| WO | WO-2013187230 A1 * | 12/2013 | ........... G01F 1/6845 |
| WO | WO-2017073271 A1 * | 5/2017 | ............... G01F 5/00 |

OTHER PUBLICATIONS

Written Opinion, PCT/JP2018/037991, dated Nov. 20, 2018, 4 pgs. (Japanese language only).

* cited by examiner

FLOW METER

TECHNICAL FIELD

The present invention relates to a flow meter.

BACKGROUND ART

A sensor module and a semiconductor module including an electronic circuit such as an electronic control unit are mounted on an internal combustion engine of an automobile or the like. A circuit substrate on which semiconductor components are mounted is used for these modules, and the circuit substrate is housed inside a housing, and a conductor terminal is used for signal input and output with an outside. The conductor terminal is, for example, a bonding wire or a press-fit terminal. In connection using a bonding wire, a wire of gold, aluminum or the like is welded to the semiconductor module, the circuit substrate or the like using heat or ultrasonic waves to achieve electrical connection. Further, in connection using a press-fit terminal, an elastic deformation region which is elastically deformed is previously formed on the press-fit terminal, and the elastic deformation region is press-fitted into a through hole formed in the circuit substrate to achieve electrical connection. Then, in the connection using the press-fit terminal, when press-fitting the elastic deformation region of the press-fit terminal into the through hole, a region in which a dimension of the through hole is smaller than a dimension of the press-fit terminal is formed. Accordingly, the elastic deformation region is deformed to make electrical connection.

PTL 1 discloses a flow rate measuring apparatus that is installed by being inserted into an apparatus insertion hole formed in a pipe, and is for measuring a flow rate of a fluid to be measured passing through a pipe passage. The flow rate measuring apparatus includes: a base made of a resin, which includes a base main body including a connector formed at a base end portion of the base main body so as to protrude to outside of the pipe, and a flange provided to radially extend from the base main body to be fitted into the apparatus insertion hole; a plate that is provided to partially overlap the base main body; a flow rate detection element that is provided on the plate in an exposed manner and for detecting the flow rate of the fluid to be measured; a circuit substrate that is provided on the plate on a connector side and includes a control circuit for processing a signal from the flow rate detection element; a cover made of a resin, which includes a circuit housing portion for covering the circuit substrate and a fluid passage groove for forming a measurement passage in cooperation with the plate; wires which are provided inside the circuit housing portion and for electrically connecting the connector and the circuit substrate; and a deformation prevention unit that is provided between an inner wall surface of the flange and an outer circumferential wall surface of the cover and for connecting the flange and the cover to prevent deformation of the base main body due to vibration of the pipe.

CITATION LIST

Patent Literature

PTL 1: JP-A-2012-098101

SUMMARY OF INVENTION

Technical Problem

In the invention described in PTL 1, measures against vibration are not sufficient.

Solution to Problem

A flow meter according to a first aspect of the invention includes a flat substrate, a housing that houses the substrate and has an open at least one surface, a cover that covers the substrate and covers the open surface of the housing, a support that supports the substrate and is in contact with the cover and the substrate, and a fixing unit that connects the substrate and the housing, in which, in a first region and a second region formed by dividing the substrate into two parts at a center in a longitudinal direction, the support is disposed in the first region, and the fixing unit is disposed in the second region.

Advantageous Effect

According to the invention, deformation of the circuit substrate due to vibration can be prevented.

DESCRIPTION OF EMBODIMENTS

First Embodiment

Hereinafter, a flow meter according to a first embodiment of the invention will be described below with reference to FIGS. 1 to 3.

Configuration

Figure 1:
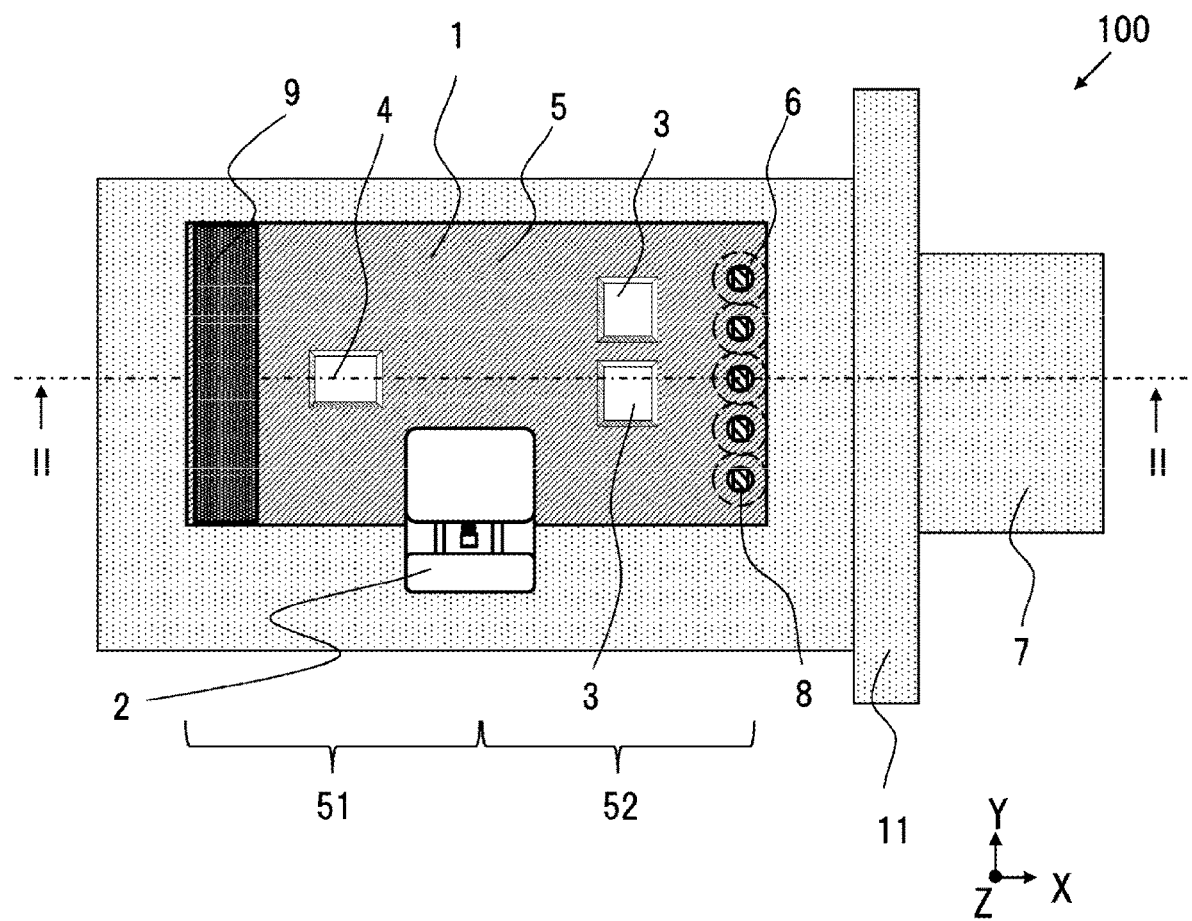
FIG. 1 is a plan view of a flow meter 100.
Figure 2:
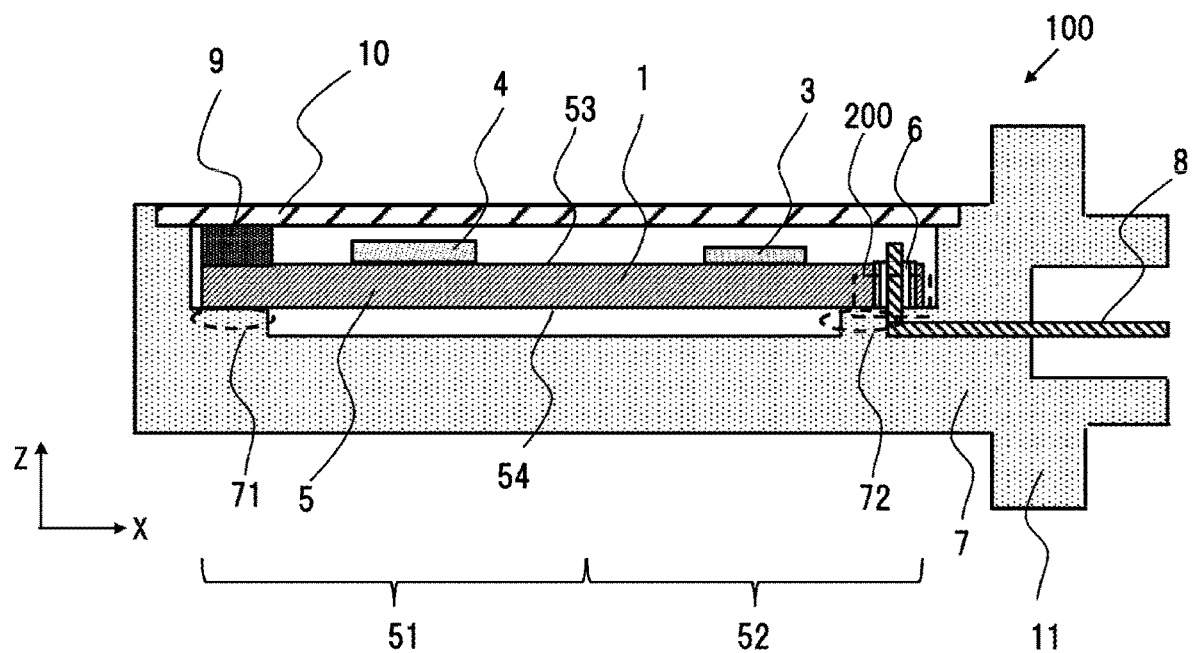
FIG. 2 is a cross-sectional view taken along II-II in FIG. 1.
Figure 3:
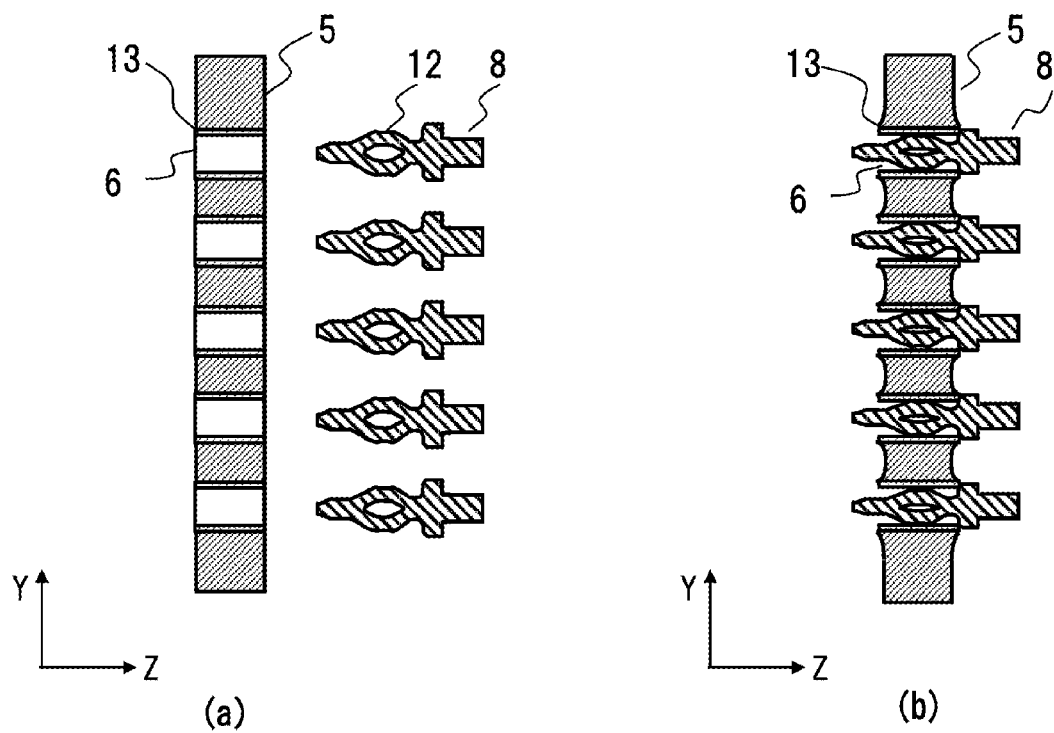
FIG. 3(a) is a diagram showing a state before press-fitting a press-fit terminal 8 into a through hole 6, and FIG. 3 (b) is a diagram showing a state after press-fitting the press-fit terminal 8 into the through hole 6.

FIG. 1 is a plan view of a flow meter 100, and FIG. 2 is a cross-sectional view showing a structure cut along a line II-II shown in FIG. 1. However, FIG. 1 shows a state where a cover 10 shown in FIG. 2 is removed. In the present embodiment, since the plan view and the cross-sectional view of the flow meter 100 are used in combination, an X axis, a Y axis, and a Z axis are defined as shown in lower right of FIG. 1 to clarify a relationship between the plan view and the cross-sectional view. These three axes are common to all drawings in the present embodiment. Hereinafter, a left-right direction in FIG. 1, that is, an X-axis direction is referred to as a longitudinal direction of a circuit substrate 5 described later. The circuit substrate 5 is divided into two parts at a center in the longitudinal direction, and a left side shown in FIG. 1 is called a first region 51, and a right side is called a second region 52. Further, surfaces of the circuit substrate 5 in the Z-axis direction are classified into front and back, and the surface at an upper side of FIG. 2 is referred to as a front surface 53 of the circuit substrate 5 and the surface at a lower side is referred to as a back surface 54 of the circuit substrate 5.

The flow meter 100 includes a circuit substrate module 1 on which various sensors and the like are mounted, a housing 7, and the cover 10 shown in FIG. 2. The circuit substrate module 1 includes a flow meter chip 2, a pressure sensor 3, a humidity sensor 4, a flat circuit substrate 5, a through hole 6, and a support 9. The flow meter chip 2, the pressure sensor 3, and the humidity sensor 4 are mounted on the circuit substrate 5 by soldering or the like. A longitudinal direction of the support 9 is disposed in a transverse direction of the circuit substrate 5.

The through hole 6 is a hole penetrating the circuit substrate 5 from the front to the back. The through hole 6 is provided on the right side in FIG. 1, that is, in the second region 52, and is used for bonding to a press-fit terminal 8 described later. The through hole 6 is preferably formed at an end portion of the circuit substrate 5, that is, at a right end of the circuit substrate 5 in FIG. 2, but may be in the second region 52. Since the through hole 6 is a hole, forming the through hole 6 at the end portion of the circuit substrate 5 means providing a thin unit capable of maintaining a shape of the hole and then making the through hole 6 at the end portion of the circuit substrate 5 as much as possible. The through hole 6 forms a fixing unit 200 together with a press-fit terminal 8 described later. The fixing unit 200 is formed on a lower part of the circuit substrate 5, that is, on the back surface 54 in FIG. 2.

The support 9 is provided on the left side in FIG. 1, that is, in the first region 51, and on the upper side in FIG. 2, that is, on the front surface of the circuit substrate 5. The support has a substantially rectangular parallelepiped shape. The support 9 is in contact with the circuit substrate 5 and the cover 10 to prevent vibration and deformation of the circuit substrate 5. The support 9 is preferably provided at the end portion of the circuit substrate 5. In FIG. 1, the flow meter chip 2 is disposed substantially at the center of the circuit substrate 5 in the longitudinal direction, the pressure sensor 3 is disposed in the second region 52, and the humidity sensor 4 is disposed in the first region 51. However, these positions on the circuit substrate 5 are not particularly limited.

The housing 7 is provided with the press-fit terminal 8 and a flange unit 11. The press-fit terminal 8 is insert-molded in the housing 7. The "press-fit terminal" is also referred to as a "press-fit pin". By press-contacting the press-fit terminal 8 and the through hole 6, the circuit substrate module 1 is mechanically coupled to the housing 7 and electrically connected to an external device. That is, the fixing unit 200 fixes the back surface 54 of the circuit substrate 5 to the housing 7. The flange unit 11 is portion where the flow meter 100 is fixed. The flow meter 100 is installed, for example, in an intake pipe of an internal combustion engine of an automobile, and the flange unit 11 is physically connected to the intake pipe.

In a manufacturing process of the flow meter 100, after press-contacting the press-fit terminal 8 and the through hole 6, the cover 10 shown in FIG. 2 is bonded to the housing 7. A flow path of air is formed in the housing 7, and an air flow rate is measured by installing the flow meter chip 2 on the flow path. A pressure and humidity inside the flowmeter 100 are measured by the pressure sensor 3 and the humidity sensor 4, respectively. An electronic component or the like for signal processing such as a temperature measurement sensor or a microcomputer (not shown) may be mounted on the circuit substrate 5.

FIG. 3(a) is a diagram showing a state before press-fitting the press-fit terminal 8 into the through hole 6, and FIG. 3(b) is a diagram showing a state after press-fitting the press-fit terminal 8 into the through hole 6. The press-fit terminal 8 includes an elastic deformation unit 12. The through hole 6 of the circuit substrate 5 includes a conductor foil 13. When the press-fit terminal 8 is press-fitted into the through hole 6, the elastic deformation unit 12 of the press-fit terminal 8 deforms and is brought into contact with the conductor foil 13 on an inner periphery of the through hole 6 of the circuit substrate 5, so that the circuit substrate 5 and the press-fit terminal 8 are electrically and mechanically connected to each other.

The press-fit terminal 8 is electrically connected via a wiring to an external device and fixed to the housing 7 by insert molding. Therefore, by electrically and mechanically connecting the circuit substrate 5 to the press-fit terminal 8, the circuit substrate 5 is electrically connected to the external device, and the circuit substrate 5 is mechanically connected to the housing 7. Since the through hole 6 passes through the front and back of the circuit substrate 5, it can be understood that the fixing unit 200 is also present on the front surface 53 of the circuit substrate 5. However, since fixing of the circuit substrate 5 to the housing 7 is performed on the back surface 54 of the circuit substrate 5, in the present embodiment, the fixing unit 200 is assumed to be present on the back surface 54 of the circuit substrate 5.

The intake pipe of the internal combustion engine of the automobile and the flow meter 100 are connected by the flange unit 11 of the housing 7 shown in FIG. 1, and when vibration occurs, the flange unit 11 becomes a starting point of the vibration. When vibration occurs, a displacement amplitude due to the vibration is particularly large at the end portion of the circuit substrate 5 far from the flange unit 11, that is, the left end of the circuit substrate 5 in FIG. 1 and FIG. 2, and a generated stress in a vicinity of the through hole 6 on the circuit substrate 5 connected to the press-fit terminal 8 increases. However, since the flowmeter 100 includes the support 9, and the support 9 is in a front and back positional relationship with the fixing unit 200, and the fixed unit 200 is provided on an opposite side in the longitudinal direction, the vibration of the circuit substrate 5 is reduced.

By providing the support 9 between the cover 10 and the circuit substrate 5 as shown in FIG. 2, even when the circuit substrate 5 is deformed to be warped to a cover side starting from the press-fit terminal 8 side due to the vibration, the deformation of the substrate is prevented by the support 9. Thereby, it is possible to prevent an increase in the generated stress in the vicinity of the through hole 6 of the circuit substrate 5 in contact with the press-fit terminal 8. Further, since a circuit substrate surface on the opposite side where the support 9 is in contact with the circuit substrate 5 is in contact with the housing 7, when the circuit substrate 5 is deformed on the opposite side to the cover, the deformation is prevented. Thereby, it is possible to prevent an increase in the generated stress in the vicinity of the through hole 6 of the circuit substrate 5 in contact with the press-fit terminal 8. A portion where the housing 7 is in contact with the circuit substrate 5, that is, a portion of the housing 7 indicated by reference numeral 71 and reference numeral 72 in FIG. 2 may be bonded to the circuit substrate 5.

As a material of the circuit substrate 5, for example, a composite material formed by impregnating resin of woven glass fiber can be used. As a material of the housing 7, for example, a resin containing glass fiber or particles can be used. As a material of the press-fit terminal 8, for example, a metal such as copper can be used. As a material of the support 9, a thermosetting resin or a thermoplastic resin, for example, a hot melt resin can be used. When a longitudinal elastic modulus, that is, a Young's modulus, of the support 9 is too low, the support 9 is extremely compressed and deformed during the vibration, and the effect of preventing the deformation of the circuit substrate 5 is reduced. Therefore, a material having a Young's modulus of 10 MPa or more is desirable for the support 9. A basis of this value will be described later. As a material of the cover 10, for example, a resin containing glass fiber particles, or a metal such as aluminum can be used.

Mounting of Support 9

A method for stably mounting the support 9 onto the circuit substrate 5 and the cover 10 will be described. First, the flow meter chip 2, sensors such as the pressure sensor 3 and the humidity sensor 4, and other electronic components such as a microcomputer are mounted onto the circuit substrate 5 by soldering or the like. Thereafter, the support 9 is formed at the end portion of the circuit substrate 5 in the first region 51 of the front surface 53 by hot melt molding. Thereby, the circuit substrate 5 and the support 9 are bonded to each other.

Then, the circuit substrate 5 on which the support 9 is mounted is crimped to the press-fit terminal 8 of the housing 7. In other words, the circuit substrate 5 is fixed to the housing 7 using the fixing unit 200. Finally, the housing 7 and the cover 10 are bonded to each other. At this time, the support 9 is fixed between the circuit substrate 5 and the housing 7 in a state of being compressed in the Z-axis direction. That is, a width of the support 9 in a natural state in the Z-axis direction is wider than a gap between the circuit substrate 5 and the housing 7. At this time, the support 9 may be adhesively bonded to the cover 10 to further improve the fixing property. The formation of the support 9 on the circuit substrate 5 and the fixing of the circuit substrate 5 to the housing 7 may be reversed in order.

According to the first embodiment described above, the following effects can be obtained.

(1) The flow meter 100 includes: the flat circuit substrate 5; the housing 7 that houses the circuit substrate 5 and has at least one open surface; the cover 10 that covers the circuit substrate 5 and covers the open surface of the housing 7; the support 9 that supports the circuit substrate 5 and is in contact with the cover 10 and the circuit substrate 5; and the fixing unit 200 that connects the circuit substrate 5 and the housing 7. In the first region 51 and the second region 52 formed by dividing the circuit substrate 5 into two parts at the center in the longitudinal direction, the support 9 is disposed in the first region 51, and the fixing unit 200 is disposed in the second region 52.

The flowmeter 100 includes the support 9 and the fixing unit 200 that supports or fixes the circuit substrate 5 in each of the first region 51 and the second region 52 formed by dividing the circuit substrate 5 into two parts in the longitudinal direction. Therefore, the deformation of the circuit substrate 5 due to the vibration applied from the outside can be prevented, a load on the fixing unit 200 can be reduced, and the reliability of the flow meter 100 can be improved. In addition, when a press-fit terminal is used for the fixing unit 200, the connection can be more easily than a case of using a bonding wire, and the effects of process shortening and part reduction are obtained.

(2) The fixing unit 200 and the support 9 are disposed at the end portion of the circuit substrate 5. Therefore, the vibration of the circuit substrate 5 can be effectively prevented.

(3) The fixing unit 200 also serves for electrical connection between the circuit substrates and the external device. Therefore, since it is not necessary to separately connect a wire or the like for the electrical connection, the configuration of the flow meter 100 is simple.

(4) The support 9 is present on a front side of the circuit substrate 5, and the fixing unit 200 is present on the back side of the circuit substrate 5. Therefore, the vibration of the circuit substrate 5 can be effectively prevented.

Modification 1

Figure 4:
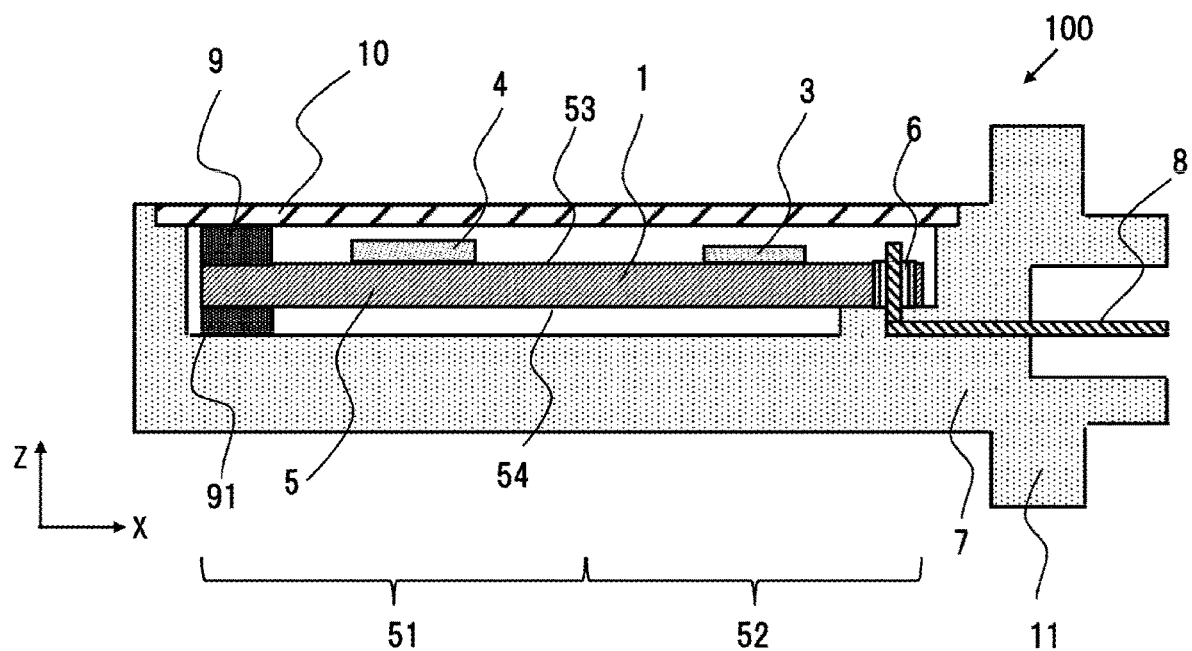
FIG. 4 is a cross-sectional view of the flow meter 100 according to a modification 1.

FIG. 4 is a cross-sectional view of the flow meter 100 according to a modification 1. In the first embodiment, the support 9 is disposed only on the front surface 53 of the circuit substrate 5, but as shown in FIG. 4, a back support 91 which is a second support is also disposed on the back surface 54 of the circuit substrate 5. The back support 91 may have the same material and shape as the support 9 or may have different materials and different shapes from the support 9. However, the back support 91 is also disposed between the housing 7 and the circuit substrate 5 in a compressed state.

Modification 2

In the first embodiment, the material of the support 9 is a thermoplastic resin or a thermosetting resin. However, the support 9 may be a metal spring. However, also in this case, a material having a Young's modulus of 10 MPa or more is desirable for the support 9.

Modification 3

Figure 5:
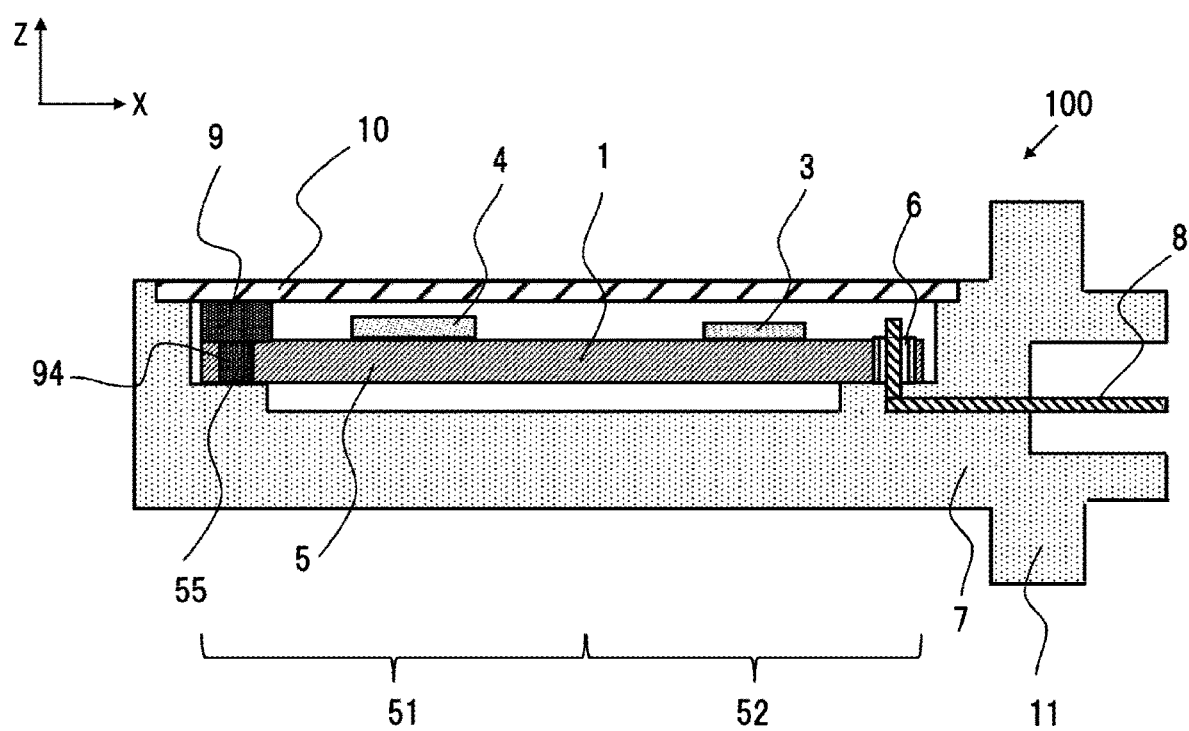
FIG. 5 is a cross-sectional view of the flow meter 100 according to a modification 3.

FIG. 5 is a cross-sectional view of the flow meter 100 according to a modification 3. The circuit substrate 5 in the modification 3 is provided with a resin filling hole 55 at the end portion of the first region 51 as shown in FIG. 5. The resin filling hole 55 is filled with a resin during the hot melt molding to form a filled support 94. However, the filled support 94 is integrally formed with the support 9. Therefore, the support 9 is more firmly fixed to the circuit substrate 5 by an anchor effect of the filled support 94.

According to the modification 3, the following effects can be obtained.

(5) The circuit substrate 5 includes the resin filling hole 55 which is a hole in a region in contact with the support 9. The resin filling hole 55 is formed with the filled support 94 integrally formed with the support 9. Therefore, the support 9 can be fixed to the circuit substrate 5 more firmly by the anchor effect.

Modification 4

The support 9 may be attached and mounted to the circuit substrate 5 by using an adhesive. In addition, the support 9 may be attached to the cover 10 using an adhesive, and the support 9 may be pressed against the circuit substrate 5 by fixing the cover 10 to the housing 7.

Modification 5

Figure 6:
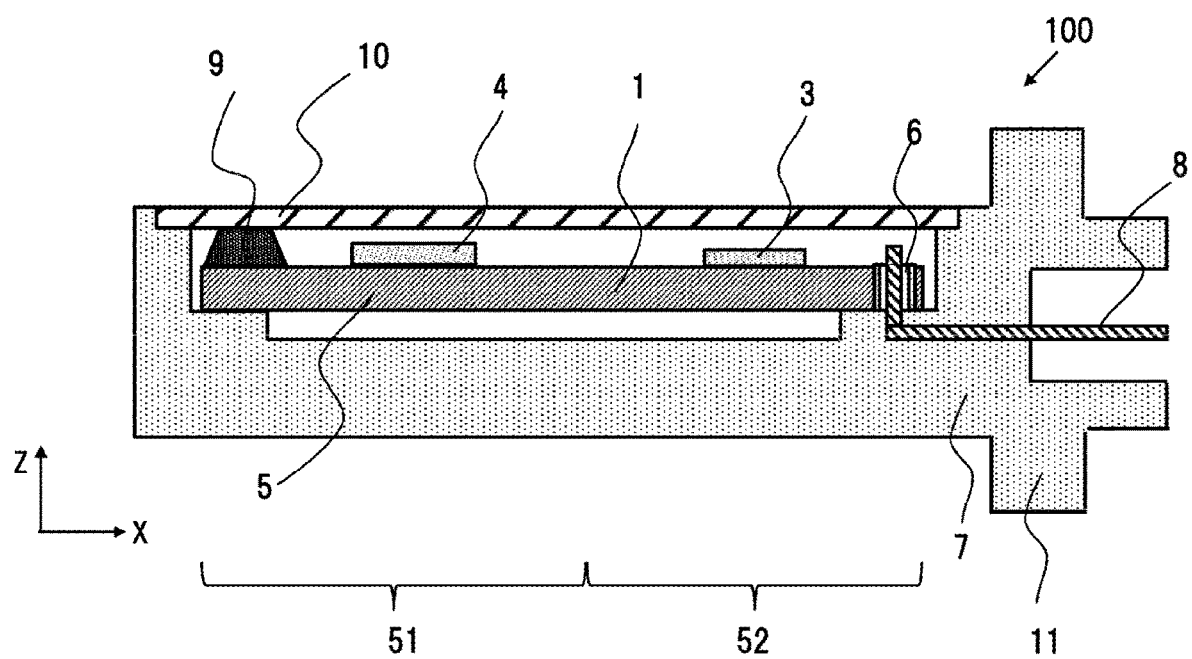
FIG. 6 is a cross-sectional view of the flow meter 100 according to a modification 5.

FIG. 6 is a cross-sectional view of the flow meter 100 according to a modification 5. In the first embodiment, the support 9 has a substantially rectangular parallelepiped shape, but the cross section of the support 9 may be trapezoidal as shown in FIG. 6. In FIG. 6, a trapezoid whose base is longer than the upper side is formed, and an area in which the support 9 is in contact with the cover 10 is smaller than an area in which the support 9 is in contact with the circuit substrate 5.

According to the modification 5, the following effects can be obtained.

(6) An area in which the support 9 is in contact with the cover 10 is smaller than the area in which the support 9 is in contact with the circuit substrate 5. Since the cross section of the support 9, that is, a projection image on an XZ plane shown in FIG. 6 is not rectangular, the support 9 can be easily compressed by the circuit substrate 5 and the cover 10 during the mounting. Further, since the area in which the support 9 is in contact with the circuit substrate 5, which is the area of the surface fixed in the previous step, is ensured to be large, the assembly can be performed efficiently.

Modification 6

Figure 7:
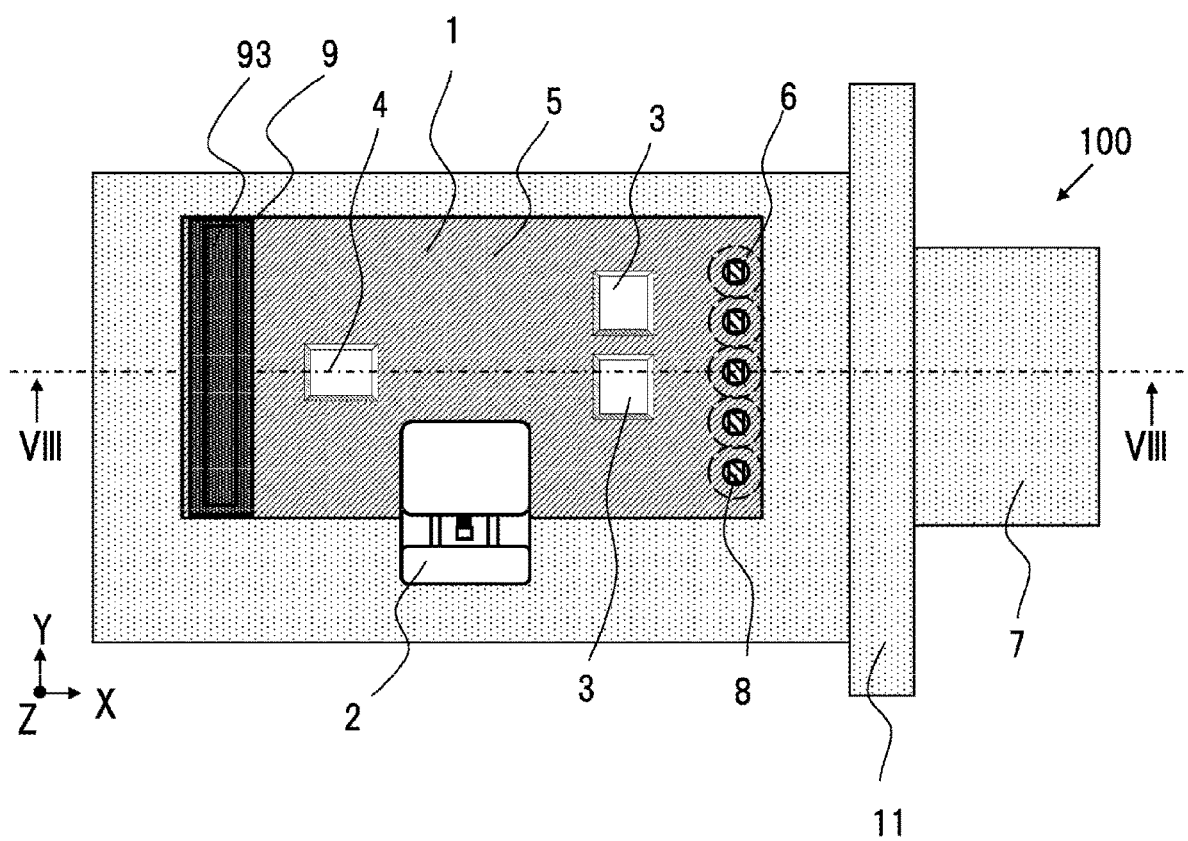
FIG. 7 is a plan view of the flow meter 100 according to a modification 6.
Figure 8:
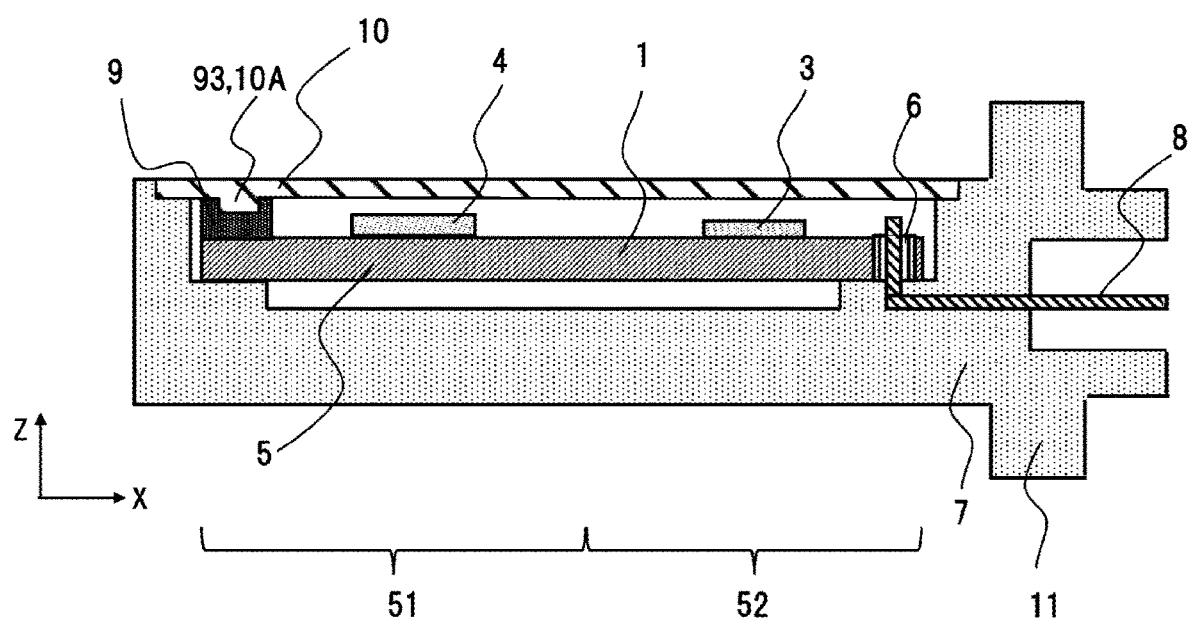
FIG. 8 is a cross-sectional view taken along VIII-VIII in FIG. 7.

FIG. 7 is a plan view of the flow meter 100 according to a modification 6, and FIG. 8 is a cross-sectional view showing a structure cut along a line VIII-VIII shown in FIG. 7. The support 9 in the modification 6 includes a concave unit 93 as shown in FIGS. 7 and 8. The cover 10 in the modification 6 includes a convex unit 10A as shown in FIG. 8. The convex unit 10A and the concave unit 93 are formed in dimensions that can be fitted to each other, and both are fitted to each other. For example, dimensions of the convex unit 10A and the concave unit 93 may be in a so-called close fit relationship or an intermediate fit relationship. The unevenness of the support 9 and the cover 10 may be reversed.

According to the modification 6, the following effects can be obtained.

(7) The support 9 includes the concave unit 93 on a surface in contact with the cover 10. The cover 10 includes the convex unit 10A fitted to the concave unit 93. According to the modification 6, a relative position between the support 9 and the cover 10 in the X-axis direction is regulated by the concave unit 93 and the convex unit 10A, so that the deformation of the circuit substrate 5 due to the vibration can be prevented.

Modification 7

Figure 9:
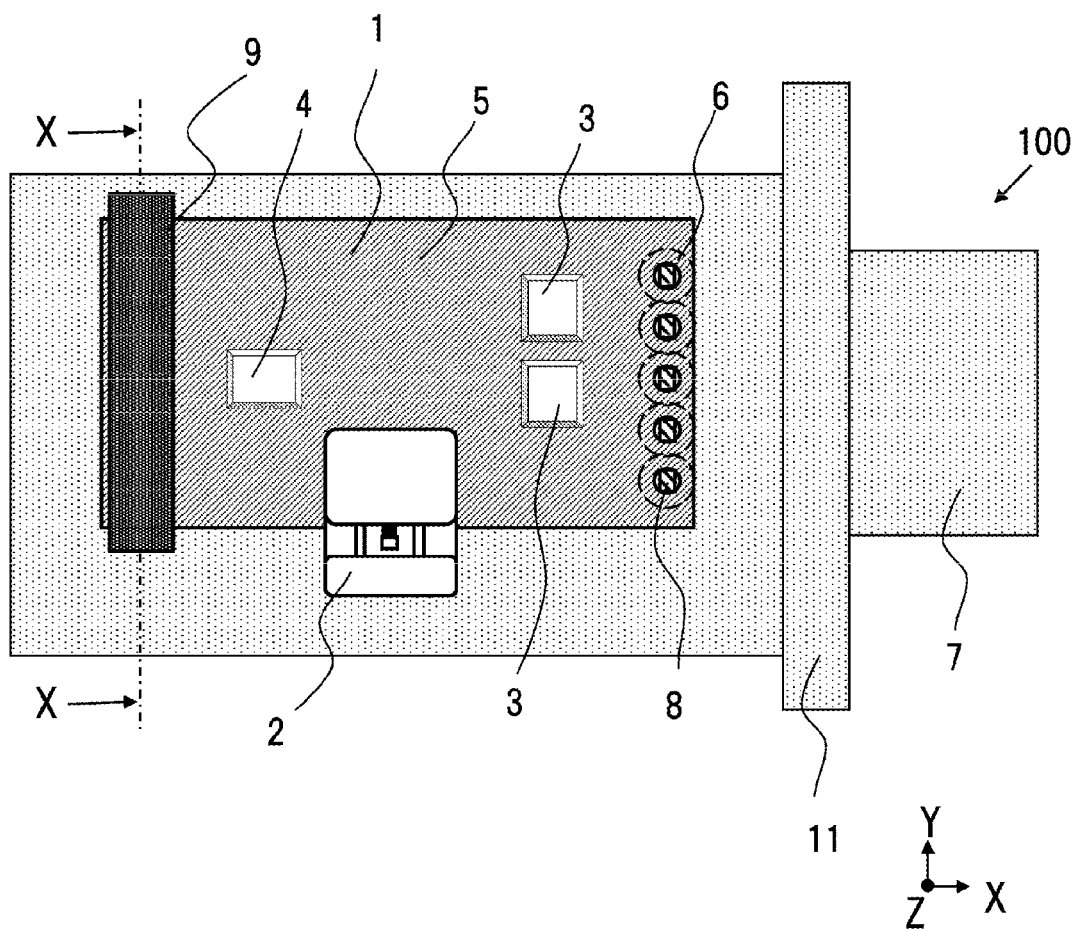
FIG. 9 is a plan view of the flow meter 100 according to a modification 7.
Figure 10:
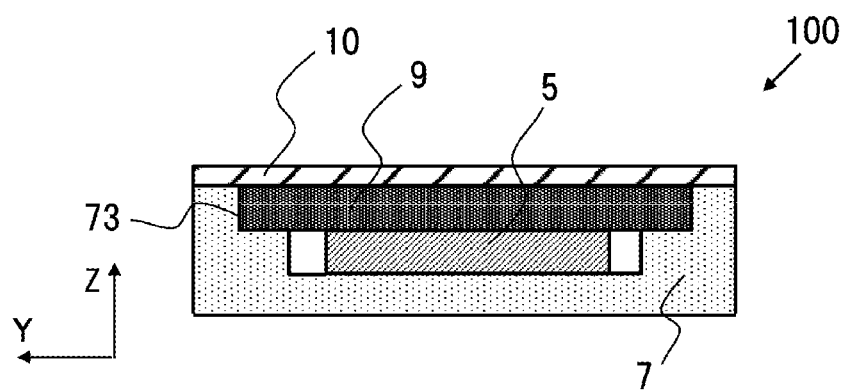
FIG. 10 is a cross-sectional view taken along X-X in FIG. 9.

FIG. 9 is a plan view of the flow meter 100 according to a modification 7. FIG. 10 is a cross-sectional view showing a structure cut along a line X-X shown in FIG. 9. As in the first embodiment, the longitudinal direction of the support 9 is disposed in the transverse direction of the circuit substrate 5. In the modification 7, a length of the support 9 in the Y direction is longer than a length of the circuit substrate 5 in the Y direction, and the housing 7 includes a notch 73 fitted to the support 9.

According to this modification 7, the following effects can be obtained.

(8) The longitudinal direction of the support 9 is disposed in the transverse direction of the circuit substrate 5. The dimension of the support 9 in the longitudinal direction is longer than the dimension of the circuit substrate 5 in the transverse direction. The housing 7 includes the notch 73 fitted to the support 9. Therefore, the relative position between the support 9 and the housing 7 in the X-axis direction is regulated, so that the deformation of the circuit substrate 5 due to the vibration can be prevented.

Second Embodiment

A flow meter according to a second embodiment of the invention will be described with reference to FIGS. 11 and 12. In the following description, the same components as those in the first embodiment will be assigned the same reference numerals and differences will be mainly described. The points that are not particularly described are the same as those in the first embodiment. The present embodiment differs from the first embodiment mainly in that the support extends in the longitudinal direction.

Figure 11:
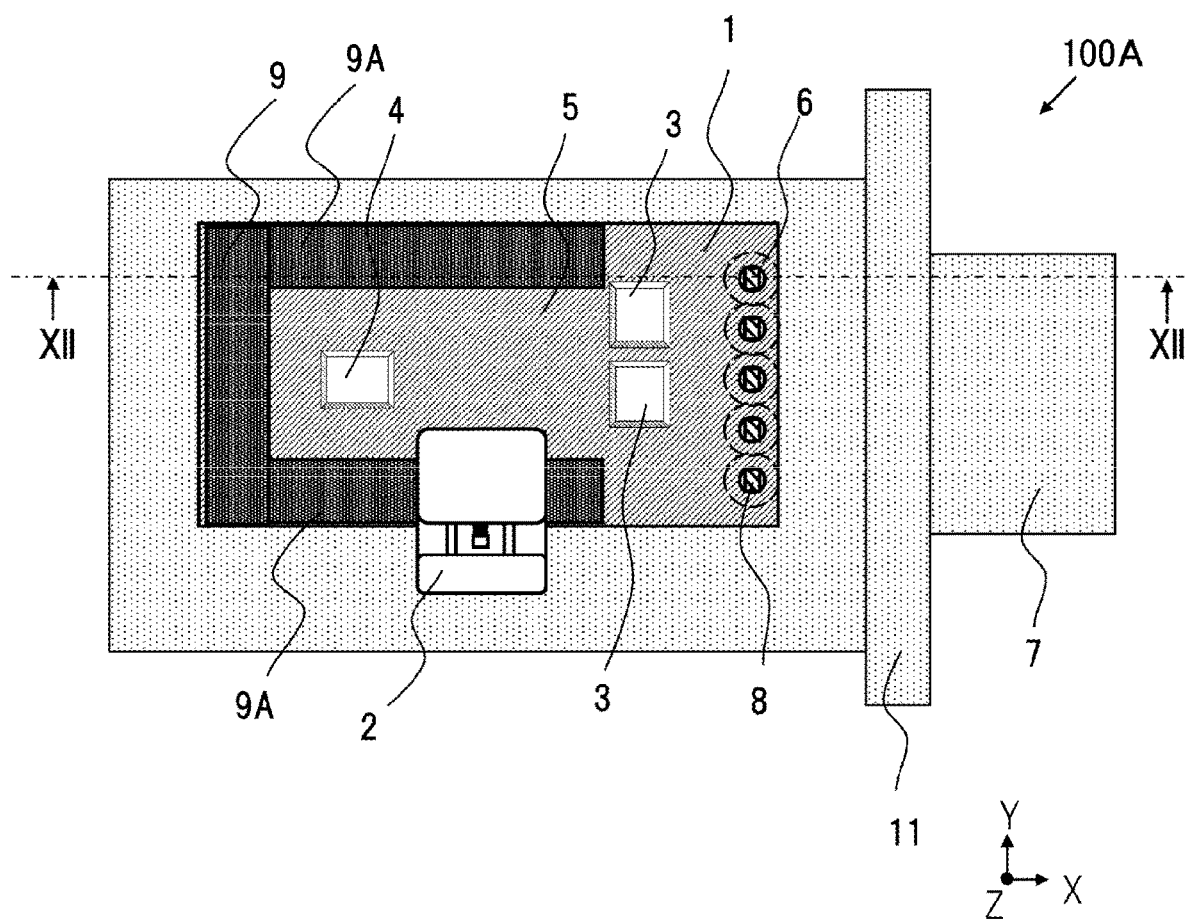
FIG. 11 is a plan view of a flow meter 100A according to a second embodiment.
Figure 12:
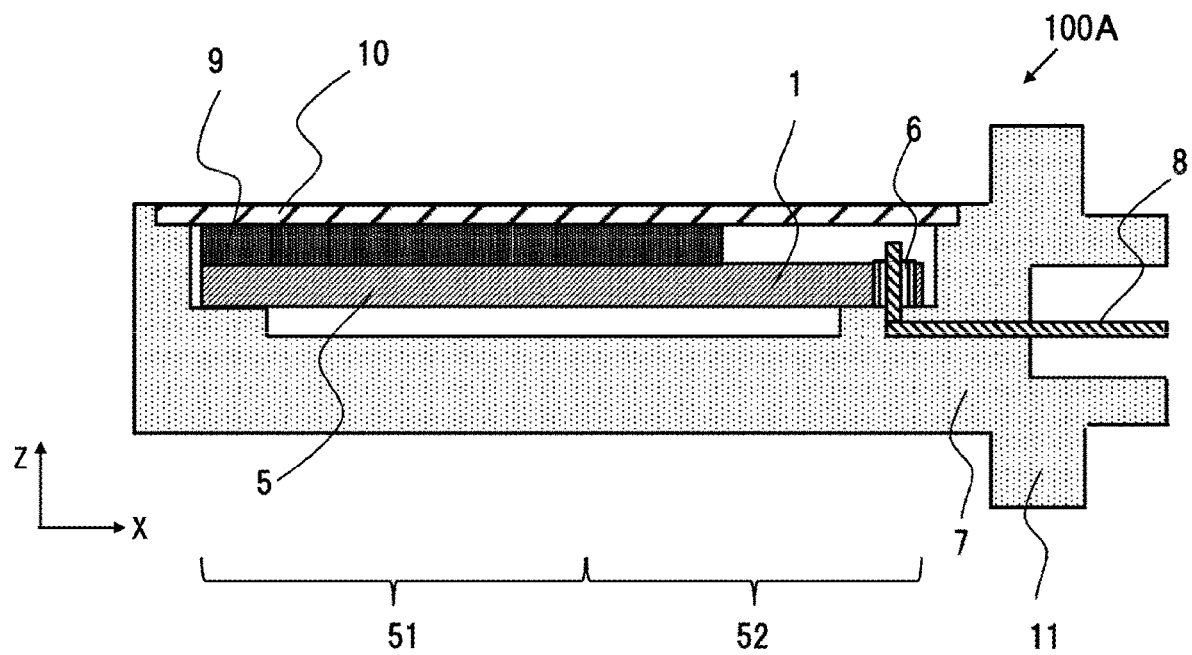
FIG. 12 is a cross-sectional view taken along XII-XII in FIG. 11.

FIG. 11 is a plan view of a flow meter 100A according to the second embodiment, and FIG. 12 is a cross-sectional view showing a structure cut along a line XII-XII shown in FIG. 11. As shown in FIGS. 11 and 12, in the second embodiment, the flow meter 100A includes, in addition to the support 9 in the first embodiment, an extending unit 9A that is adjacent to the support 9 and extends to the right side in the longitudinal direction along an outer periphery of the circuit substrate 5, that is, along the positive direction of the X-axis direction. The extending unit 9A reaches the second region 52. That is, the support 9 or the extending unit 9A is present in an outer peripheral portion of the front surface 53 of the circuit substrate 5 and the first region 51.

A material of the extending unit 9A and a method of forming the same are the same as those of the support 9. For example, the extending unit 9A is formed by hot melt molding in the same manner as the support 9 at the timing when the support 9 is formed. The support 9 and the extending unit 9A may be separated from each other or may be integrally formed.

By adding the extending unit 9A in the longitudinal direction of the circuit substrate 5, a support region is increased by the extending unit 9A, so that the effect of pressing the circuit substrate 5 during the deformation of the substrate due to the vibration is enhanced. However, on the other hand, since the cover 10 in contact with the support 9 and the extending unit 9A is also deformed by vibration, the following concerns arise when the elastic modulus of the support 9 is too high in the present embodiment. That is, there is a possibility that the support 9 and the extending unit 9A do not compressed or deformed and transmits the deformation of the cover 10 to the circuit substrate 5, and the circuit substrate 5 is pressed excessively. Therefore, in the present embodiment, the elastic modulus of the support 9 and the extending unit 9A is preferably 10 MPa to 1000 MPa. Further, a spring having an elastic modulus of 10 MPa to 1000 MPa may be used for the support 9 and the extending unit 9A.

According to the second embodiment described above, the following effects can be obtained.

(9) The flow meter 100A includes the extending unit 9A that is adjacent to the support 9, is disposed on the outer peripheral portion of the circuit substrate 5, supports the circuit substrate 5, and is in contact with the cover 10 and the circuit substrate 5. Therefore, the vibration of the circuit substrate 5 can be further prevented by the extending unit 9A.

Modification of Second Embodiment

In the second embodiment, the extending unit of the support 9 reaches the second region 52. However, the extending unit of the support 9 may be accommodated inside the first region 51, in other words, the extending unit of the support 9 may have a length up to the center of the circuit substrate 5 in the longitudinal direction.

Third Embodiment

A third embodiment of the flow meter according to the invention will be described with reference to FIGS. 13 and 14. In the following description, the same components as those in the first embodiment will be assigned the same reference numerals and differences will be mainly described. The points that are not particularly described are the same as those in the first embodiment. The present embodiment differs from the first embodiment mainly in that the housing includes a protrusion unit.

Figure 13:
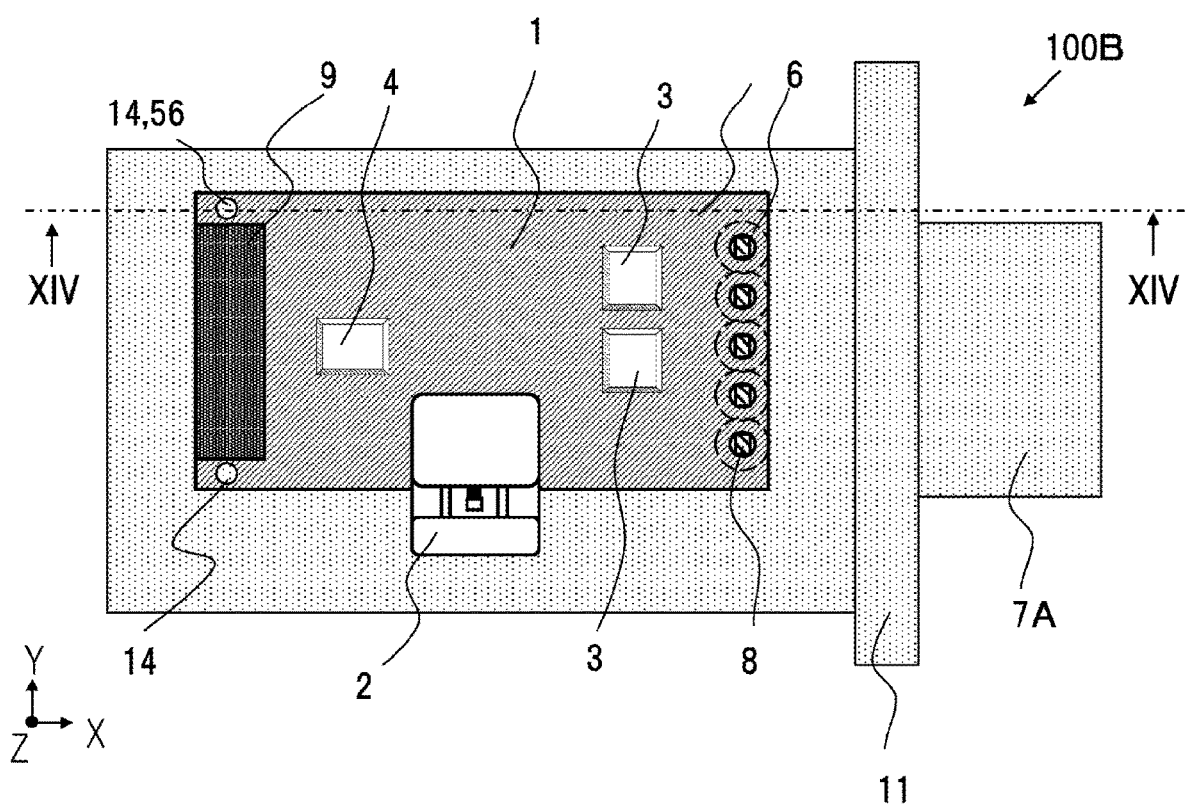
FIG. 13 is a plan view of a flow meter 100B according to a third embodiment.
Figure 14:
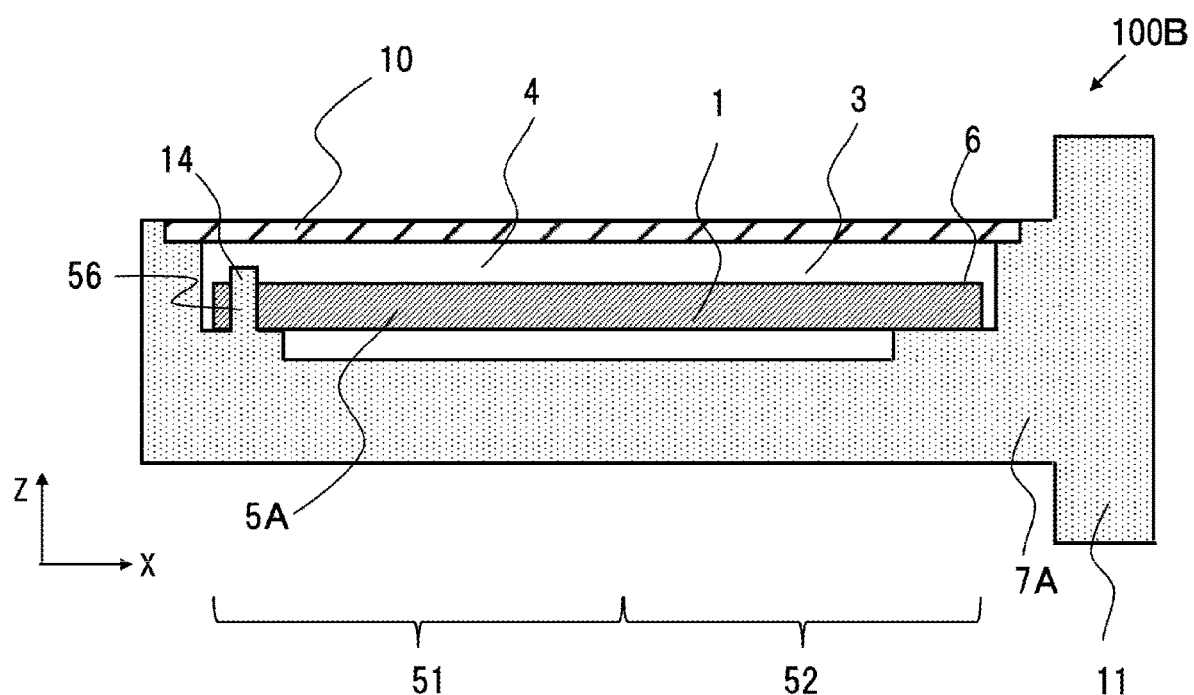
FIG. 14 is a cross-sectional view taken along XIV-XIV in FIG. 13.

FIG. 13 is a plan view of a flow meter 100B according to the third embodiment, and FIG. 14 is a cross-sectional view showing a structure cut along a line XIV-XIV shown in FIG. 13. A housing 7A in the third embodiment includes a protrusion unit 14. The protrusion unit 14 is provided at the end portion of the first region 51 in the longitudinal direction and at both ends in the transverse direction, as shown in FIG. 13. Further, as shown in FIG. 14, a height dimension of the protrusion unit 14 is longer than a thickness of a circuit substrate 5A. The circuit substrate 5A includes a protrusion unit corresponding hole 56 corresponding to the protrusion unit 14.

The circuit substrate 5A is disposed such that the protrusion unit 14 of the housing 7 and the protrusion unit corresponding hole 56 are fitted to each other. That is, the protrusion unit 14 is used for positioning when mounting the circuit substrate module 1 onto the housing 7A. Furthermore, the protrusion unit 14 prevents a deviation of the circuit substrate 5A mainly in an XY plane due to the vibration during use of the flow meter 100B. The deformation of the substrate of the flow meter 100B in the Z direction is prevented by the support 9 as in the first embodiment.

According to the third embodiment described above, the following effects can be obtained.

(10) The circuit substrate 5 includes the protrusion unit corresponding hole 56 in the first region 51. The housing 7 includes the protrusion unit 14 that protrudes toward the circuit substrate side and penetrates the protrusion corresponding hole 56. Therefore, the protrusion unit 14 can prevent the deviation of the circuit substrate 5A mainly in the XY plane due to the vibration during the use of the flow meter 100B.

Modification 1 of Third Embodiment

Figure 15:
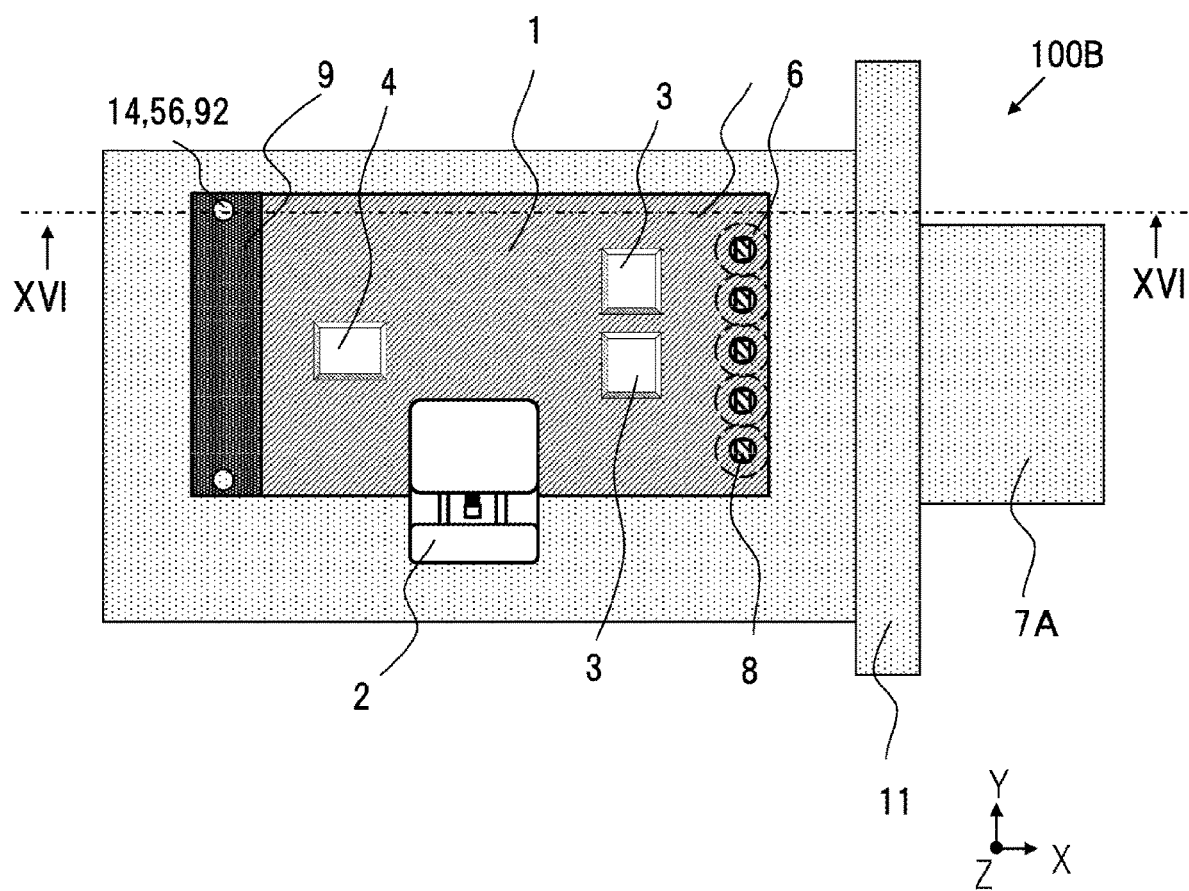
FIG. 15 is a plan view of the flow meter 100B according to a modification 1 of the third embodiment.
Figure 16:
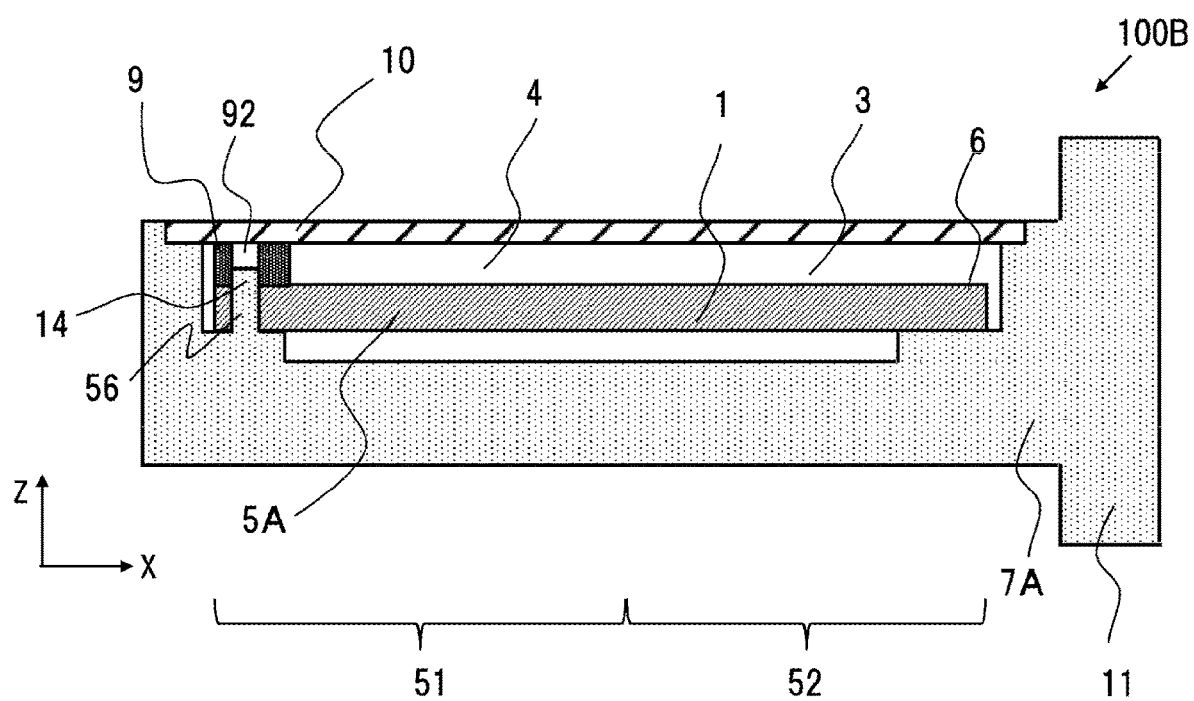
FIG. 16 is a cross-sectional view taken along XVI-XIV in FIG. 15.

FIG. 15 is a plan view of the flow meter 100B according to a modification 1 of the third embodiment, and FIG. 16 is a cross-sectional view showing a structure cut along a line XVI-XVI shown in FIG. 15. In the present modification, the support 9 further includes a protrusion unit extending corresponding hole 92. The flow meter 100B is configured by mounting the circuit substrate 5A on the housing 7A, and then inserting the support 9 such that an inner surface of the protrusion unit extending corresponding hole 92 is in contact with an outer surface of the protrusion unit 14 of the housing 7.

According to the present modification, since the support 9 includes the protrusion unit extending corresponding hole 92 and the protrusion unit extending corresponding hole 92 is fitted to the protrusion unit 14 of the housing 7A, it is possible to prevent the deviation of the support 9 in the XY plane.

Simulation Analysis

Results of simulation analysis of the flowmeter in the first embodiment and the second embodiment will be described with reference to FIGS. 17 to 21. Further, a structure in which the support 9 is removed from the flow meter 100 in the first embodiment is called "a comparative example" below. Hereinafter, the comparative example, the flow meter 100, and the flow meter 100A will be compared regarding a stress in the vicinity of the through hole 6 of the circuit substrate 5 when the vibration occurs in the flow meter 100. Further, in the flow meter 100 and the flow meter 100A, the elastic modulus of the support 9 is changed in multiple ways, and the influence of the elastic modulus on stress relaxation is investigated. However, the extending unit 9A in the second embodiment is made the same as the support 9. For example, when the elastic modulus of the support 9 is 1 GPa, the elastic modulus of the extending unit 9A is 1 GPa, and when the elastic modulus of the support 9 is 10 GPa, the elastic modulus of the extending unit 9A is 10 GPa. In the analysis, analysis is performed using simulation methods known with computer simulation software.

Analytical Model

Figure 17:
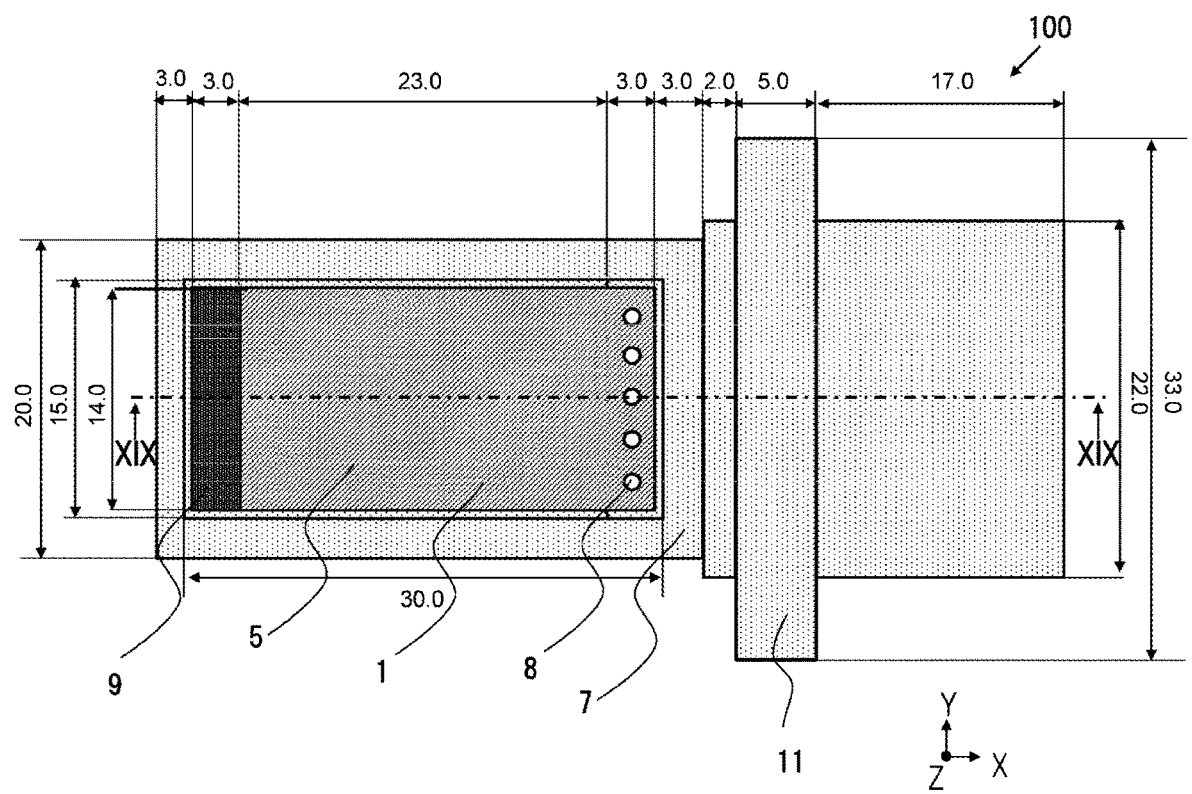
FIG. 17 is a dimension view of a plane of the flow meter 100.
Figure 18:
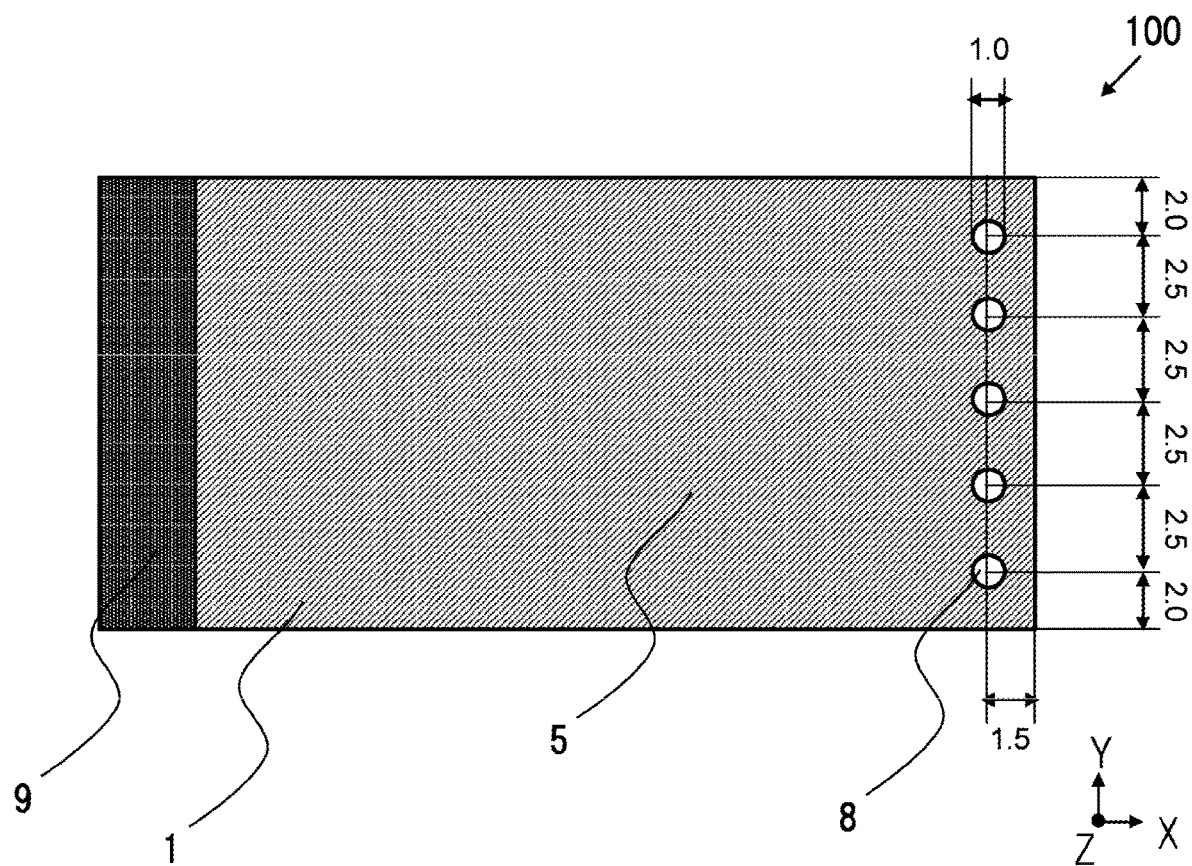
FIG. 18 is a dimension view of a plane of a circuit substrate 5.
Figure 19:
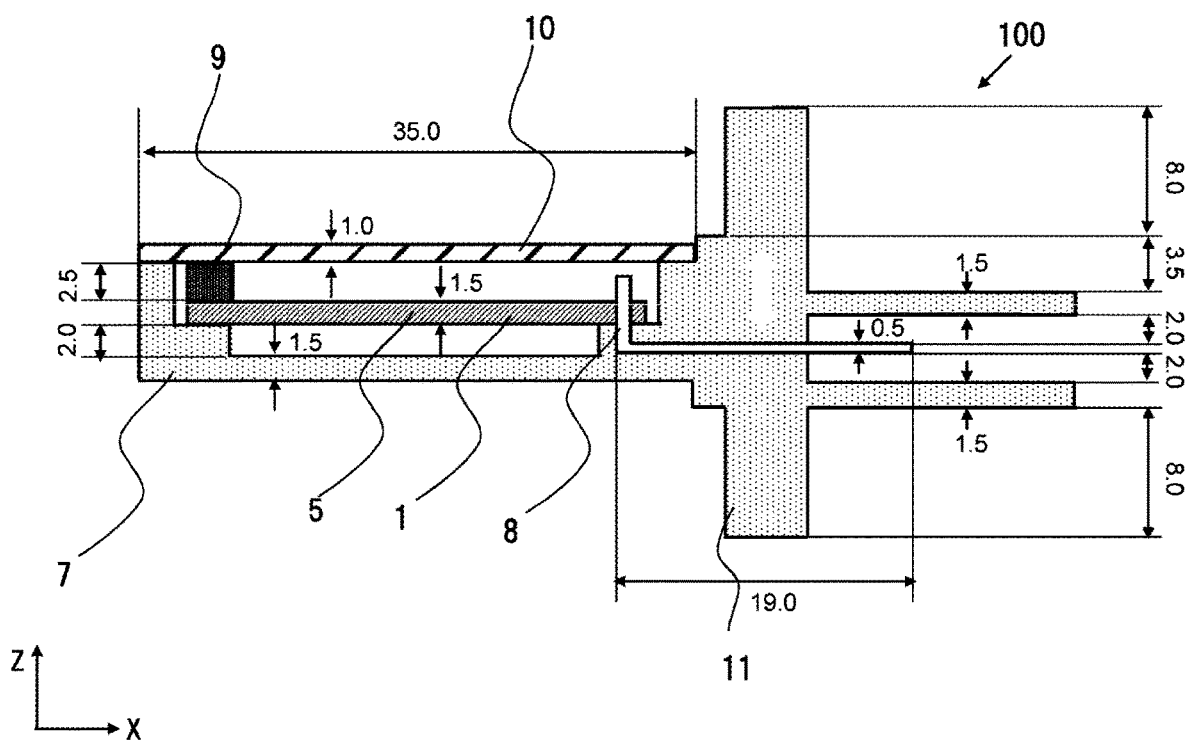
FIG. 19 is a dimension view of a cross section taken along XIX-XIX in FIG. 17.

FIGS. 17 to 19 show an analytical model of the flowmeter 100 according to the first embodiment, in other words, the dimension of the flow meter 100. FIG. 17 is a dimension view of a plane of the flow meter 100, FIG. 18 is a dimension view of a plane of the circuit substrate 5 of the flow meter 100, and FIG. 19 is a dimension view of a cross section taken along XIX-XIX in FIG. 17. In the analysis, the circuit substrate 5, the housing 7, the press-fit terminal 8, the support 9, and the cover 10 are incorporated, and various other sensors and the like are excluded from the model for calculation.

Figure 20:
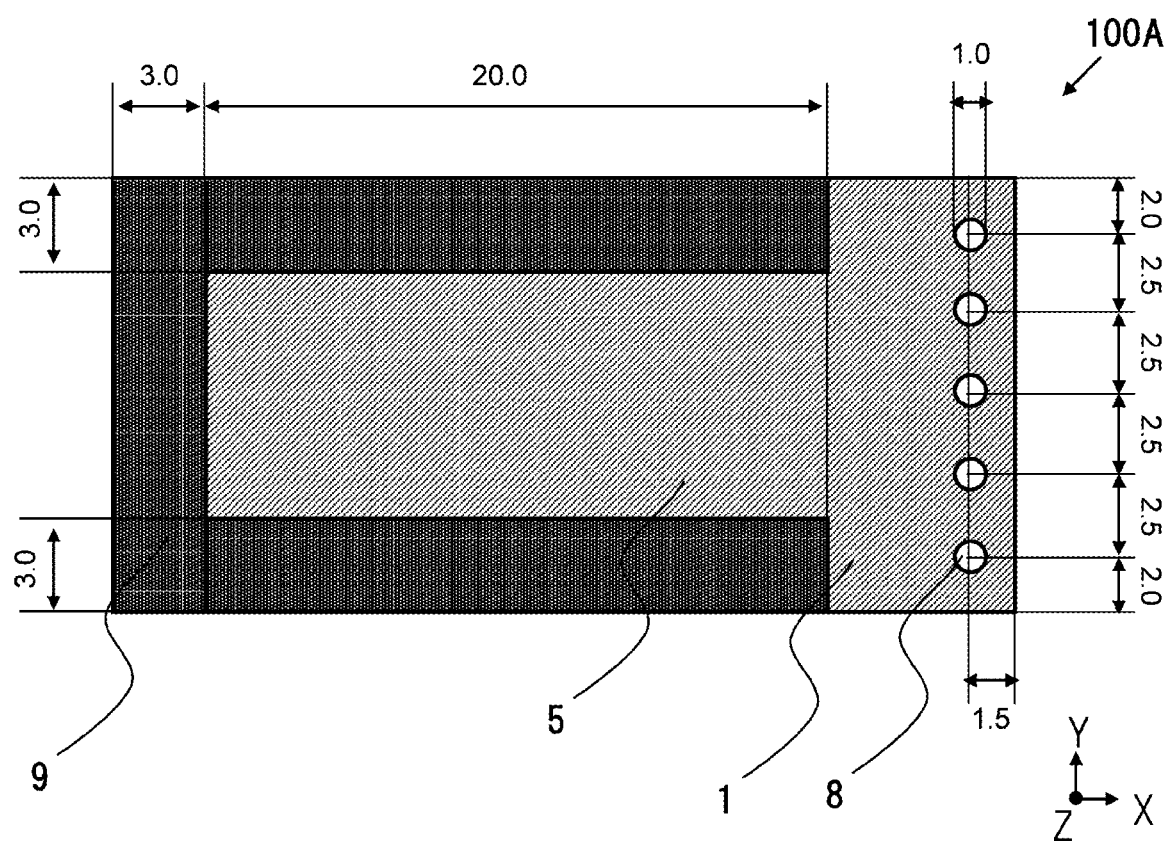
FIG. 20 is a dimension view of a cross section taken along XIX-XIX of the flow meter 100A.

FIG. 20 shows an analysis model of the flowmeter 100A in the second embodiment, in other words, the dimension of the flow meter 100A. Since the flow meter 100A is the same as the flow meter 100 except for the dimension of the support, only the cross-sectional view along XIX-XIX in FIG. 17 corresponding to FIG. 19 of the flow meter 100 is shown. In the analysis, as in the first embodiment, the circuit substrate 5, the housing 7, the press-fit terminal 8, the support 9, and the cover 10 are incorporated, and various other sensors and the like are excluded from the model for calculation.

As physical property data, the circuit substrate 5 is, for example, a printed circuit substrate, and has an elastic modulus of 20.4 GPa, a Poisson's ratio of 0.2, and a density of 2000 kg/m$^3$. In the region of the housing 7, a resin containing a glass filler is assumed as an example, and has an elastic modulus of 8.1 GPa, a Poisson's ratio of 0.35, and a density of 1570 kg/m$^3$. In the region of the press-fit terminal 7, bronze is assumed as an example, and has an elastic modulus of 115 GPa, a Poisson's ratio of 0.32, and a density of 8830 kg/m$^3$.

The cover 10 is made of, for example, aluminum, and has an elastic modulus of 71 GPa, a Poisson's ratio of 0.33, and a density of 2770 kg/m$^3$. In a region 17 of the support, a low rigidity resin such as an elastomer is assumed as an example, and has a Poisson's ratio of 0.499 equivalent to that of rubber, and a density of 1200 kg/m$^3$. Further, in order to grasp the influence of the stress reduction effect due to the elastic modulus, the elastic modulus is changed widely with 0.1 MPa, 1 MPa, 10 MPa, 100 MPa, 1000 MPa, and 10000 MPa. In addition, a damping ratio required for frequency response analysis is 0.0135 same for the structures.

Load Condition

As a loading condition, a periodic load of 30 G is loaded in the Z direction of the flange unit 11 shown in FIG. 19. In addition, as a contact condition, the analysis is performed when the inner periphery of the through hole 6 of the circuit substrate 5 and the press-fit terminal 8 are in a bonded state.

Analysis Result

Figure 21:
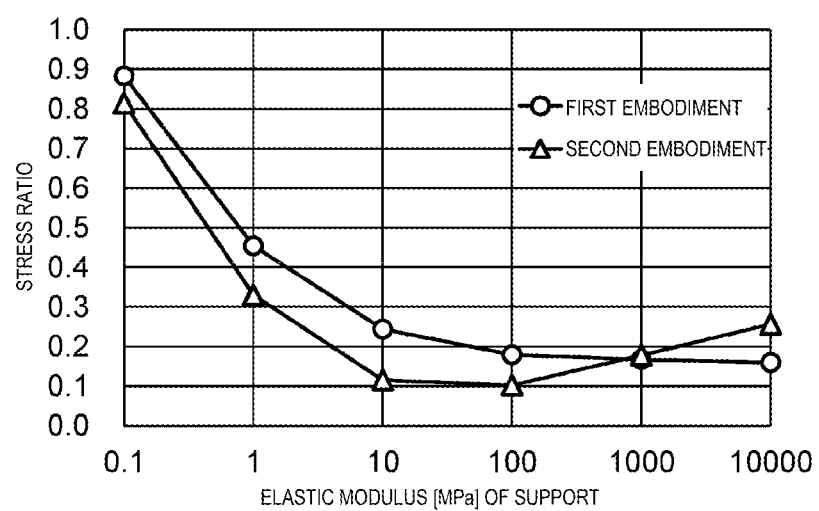
FIG. 21 is a diagram showing an analysis result.

FIG. 21 is a diagram showing an analysis result. The flow meter 100 and the flow meter 100A are analyzed by changing the elastic modulus of the support 9 to six ways of 0.1 MPa, 1 MPa, 10 MPa, 100 MPa, 1000 MPa, and 10000 MPa. Since the comparative example does not have the support 9 as described above, only one analysis is performed. The stress in the vicinity of the through hole 6 of the circuit substrate 5 is calculated in each analysis, and a value obtained by dividing a calculated value in the flow meter 100 and the flow meter 100A by a calculated value in the comparative example is shown in FIG. 21. In FIG. 21, a calculation result of the flow meter 100 is a circle plot, and a label of the "first embodiment" is attached. Further, in FIG. 21, the calculation result of the flow meter 100A is a triangular plot, and a label of the "second embodiment" is attached.

First, a rough tendency will be described. When the elastic modulus of the support 9 is 0.1 MPa, a stress ratio of the flow meter 100 and the flow meter 100A is about 0.8 to 0.9. That is, in this case, a difference from the comparative example without the support 9 is only 10% to 20%, and the effect of stress reduction is low. However, it is understood that when the elastic modulus of the support 9 increases, the stress ratio decreases, that is, the effect of stress reduction is increased. However, the stress ratio does not necessarily decrease monotonically with the increase of the elastic modulus. The details are as follows.

In the flow meter 100 shown by the circle plot in FIG. 21, the stress ratio decreases as the elastic modulus of the support 9 increases from 0.1 MPa to 10 MPa. It is considered that this is because the support 9 is largely deformed in a region where the elastic modulus of the support 9 is extremely low such as 0.1 MPa, and the deformation of the circuit substrate 5 cannot be sufficiently prevented. On the other hand, there is no large difference in the stress reduction effect at a degree where the stress ratio slightly decreases even when the elastic modulus increases to be higher than 10 MPa. From this result, in the structure of the flow meter 100 in the first embodiment, the elastic modulus of the support 9 is preferably 10 MPa or more.

Similar to the flow meter 100, the stress ratio of the flow meter 100A shown by the triangular plot in FIG. 21 decreases as the elastic modulus of the support 9 increases from 0.1 MPa to 10 MPa. However, in the flow meter 100A, when the elastic modulus of the support 9 exceeds 100 MPa, the stress ratio starts to increase. It is considered that this is because when the elastic modulus of the support 9 increases, the deformation of the cover 10 due to the vibration cannot be absorbed by the deformation of the support 9 and is transmitted to the circuit substrate 5 and the effect of preventing the deformation of the circuit substrate 5 is reduced. The stress ratio of the flow meter 100A is lower than the stress ratio of the flow meter 100 until the elastic modulus of the support 9 is 100 MPa, so that the stress reduction effect is high. However, the stress ratio of the flowmeter 100 is almost equal to the stress ratio of the flowmeter 100A at 1000 MPa, and thereafter the stress reduction effect is higher than that in the first embodiment. Therefore, also in consideration of the flow meter 100A, the elastic modulus of the support 9 is preferably 10 MPa or more and 1000 MPa or less.

The following results are obtained from the above simulation analysis.

(11) The Young's modulus, that is, the longitudinal elastic modulus, of the support 9 is preferably 10 MPa or more. By setting the Young's modulus of the support 9 to 10 MPa or more, the stress reduction effect of the support 9 can be enhanced.

The above embodiments and modifications may be combined with each other. Although various embodiments and modifications are described above, the invention is not limited to these contents. Other embodiments that are considered within the scope of the technical idea of the invention are also included within the range of the invention.

The disclosure content of the following priority basic application is incorporated herein by reference.

Japanese patent application 2017-227155 (filed on Nov. 27, 2017)

REFERENCE SIGN LIST 1 circuit substrate module
5 circuit substrate
6 through hole
7 housing
9 support
10 cover
14 protrusion unit
51 first region
52 second region
53 front surface 54 back surface
55 resin filling hole
56 protrusion unit corresponding hole
91 back surface support
92 protrusion unit extending corresponding hole
93 concave unit
94 filled support
100, 100A, 100B flow meter
200 fixing unit

The invention claimed is:

1. A flow meter, comprising:
a flat substrate;
a housing that houses the substrate and has an opening in at least one surface;
a cover that covers the substrate and covers the opening in the surface of the housing;
a support that supports the substrate and is in contact with the cover and the substrate;
a fixing unit that connects the substrate and the housing; and
an extending unit that is adjacent to the support, is disposed at an outer peripheral portion of the substrate, supports the substrate, and is in contact with the cover and the substrate;
wherein
in a first region and a second region formed by dividing the substrate into two parts at a center in a longitudinal direction, the support is disposed in the first region, and the fixing unit is disposed in the second region; and
wherein the fixing unit and the support are disposed at an end portion of the substrate.

2. The flow meter according to claim 1, wherein
a Young's modulus of the support is 10 MPa or more and 1000 MPa or less.

3. The flow meter according to claim 1, wherein
an area in which the support is in contact with the cover is smaller than an area in which the support is in contact with the substrate.

4. The flow meter according to claim 1, wherein
the fixing unit also serves for electrical connection.

5. The flow meter according to claim 1, wherein
the support is at least present on a front side of the substrate, and
the fixing unit is present on a back side of the substrate.

6. The flow meter according to claim 1, wherein
the support includes a support fitting unit which is a concave unit or a convex unit on a surface in contact with the cover, and
the cover includes a cover fitting unit that is fitted to the support fitting unit.

7. The flow meter according to claim 1, wherein
the longitudinal direction of the support is disposed in a transverse direction of the substrate,
a dimension of the support in the longitudinal direction is longer than a dimension of the substrate in the transverse direction, and
the housing includes a notch that is fitted to the support.

8. A flow meter, comprising:
a flat substrate;
a housing that houses the substrate and has an opening in at least one surface;
a cover that covers the substrate and covers the opening in the surface of the housing;
a support that supports the substrate and is in contact with the cover and the substrate; and
a fixing unit that connects the substrate and the housing; wherein
in a first region and a second region formed by dividing the substrate into two parts at a center in a longitudinal direction, the support is disposed in the first region, and the fixing unit is disposed in the second region; and
wherein
the substrate includes a protrusion corresponding hole which is a hole in the first region, and
the housing includes a protrusion unit that protrudes toward a substrate side and penetrates the protrusion corresponding hole.

9. The flow meter according to claim 8, wherein
a Young's modulus of the support is 10 MPa or more and 1000 MPa or less.

10. The flow meter according to claim 8, wherein
an area in which the support is in contact with the cover is smaller than an area in which the support is in contact with the substrate.

11. The flow meter according to claim 8, wherein
the fixing unit also serves for electrical connection.

12. The flow meter according to claim 8, wherein
the support is at least present on a front side of the substrate, and
the fixing unit is present on a back side of the substrate.

13. The flow meter according to claim 8, wherein
the support includes a support fitting unit which is a concave unit or a convex unit on a surface in contact with the cover, and
the cover includes a cover fitting unit that is fitted to the support fitting unit.

14. The flow meter according to claim 8, wherein
the longitudinal direction of the support is disposed in a transverse direction of the substrate,
a dimension of the support in the longitudinal direction is longer than a dimension of the substrate in the transverse direction, and
the housing includes a notch that is fitted to the support.

15. A flow meter, comprising:
a flat substrate;
a housing that houses the substrate and has an opening in at least one surface;
a cover that covers the substrate and covers the opening in the surface of the housing;
a support that supports the substrate and is in contact with the cover and the substrate; and
a fixing unit that connects the substrate and the housing; wherein
in a first region and a second region formed by dividing the substrate into two parts at a center in a longitudinal direction, the support is disposed in the first region, and the fixing unit is disposed in the second region; and
wherein
the substrate includes a filling hole which is a hole in a region in contact with the support, and
the filling hole is filled with a filled support integrally formed with the support.

16. The flow meter according to claim 15, wherein
an area in which the support is in contact with the cover is smaller than an area in which the support is in contact with the substrate.

17. The flow meter according to claim 15, wherein
the fixing unit also serves for electrical connection.

18. The flow meter according to claim 15, wherein
the support is at least present on a front side of the substrate, and
the fixing unit is present on a back side of the substrate.

19. The flow meter according to claim 15, wherein
the support includes a support fitting unit which is a concave unit or a convex unit on a surface in contact with the cover, and
the cover includes a cover fitting unit that is fitted to the support fitting unit.

20. The flow meter according to claim 15, wherein
the longitudinal direction of the support is disposed in a transverse direction of the substrate,
a dimension of the support in the longitudinal direction is longer than a dimension of the substrate in the transverse direction, and
the housing includes a notch that is fitted to the support.

\* \* \* \* \*